United States Patent [19]

Caine

[11] Patent Number: 5,682,409

[45] Date of Patent: Oct. 28, 1997

[54] NEUTRON FLUENCE SURVEILLANCE CAPSULE HOLDER MODIFICATION FOR BOILING WATER REACTOR

[75] Inventor: Thomas Alfred Caine, San Jose, Calif.

[73] Assignee: General Electric Company, San Jose, Calif.

[21] Appl. No.: 689,957

[22] Filed: Aug. 16, 1996

[51] Int. Cl.$^6$ .................................................. G21C 17/00
[52] U.S. Cl. ........................... 376/202; 376/245; 376/249; 376/254
[58] Field of Search .................................. 376/202, 245, 376/249, 254, 341, 433; 976/DIG. 35; 73/82, 431, 855, 866.4

[56] References Cited

U.S. PATENT DOCUMENTS

| | | | |
|---|---|---|---|
| 3,284,306 | 11/1966 | Balla | 376/202 X |
| 3,294,642 | 12/1966 | Recule et al. | 376/202 |
| 3,549,492 | 12/1970 | Ricci et al. | 376/202 X |
| 3,773,615 | 11/1973 | Blatter | 376/202 |
| 4,196,047 | 4/1980 | Mitchem et al. | 376/202 |
| 4,464,331 | 8/1984 | Bezer et al. | 376/202 |
| 4,801,421 | 1/1989 | Ackerson et al. | 376/249 |
| 4,842,807 | 6/1989 | Fero et al. | 376/254 |
| 4,844,858 | 7/1989 | Fero et al. | 376/254 |
| 5,307,385 | 4/1994 | Shimanuki et al. | 376/249 |

FOREIGN PATENT DOCUMENTS

| | | | |
|---|---|---|---|
| 0454893 | 11/1991 | European Pat. Off. | 376/245 |
| 2053925 | 5/1972 | Germany | 376/202 |
| 62-006199 | 2/1987 | Japan | 376/202 |
| 0820485 | 5/1983 | U.S.S.R. | 376/202 |

*Primary Examiner*—Michael J. Carone
*Assistant Examiner*—Matthew J. Lattig
*Attorney, Agent, or Firm*—James E. McGinness; Dennis M. Flaherty

[57] ABSTRACT

An apparatus for carrying out a surveillance program to monitor the neutron fluence and its effect on vessel materials at a position in the annular space between the pressure vessel and core shroud of a boiling water reactor for the purpose of monitoring vessel embrittlement. The apparatus includes an offset capsule holder assembly which fits in an existing capsule holder attached to the inner surface of the pressure vessel wall. The offset capsule holder assembly positions a new capsule holder radially closer to the core, by an amount determined by neutron transport calculations. The new capsule holder is geometrically identical to the original, or a "replacement in kind", allowing the original surveillance capsules to be immediately reinstalled. With the water moderator in the downcomer annulus, the fluence rate increases significantly when the surveillance capsule is moved radially inward from the pressure vessel inside surface toward the core.

10 Claims, 5 Drawing Sheets

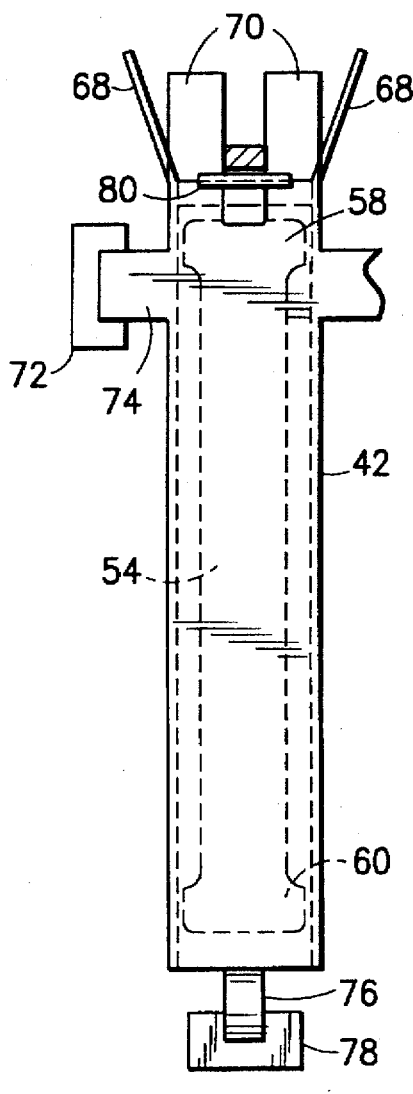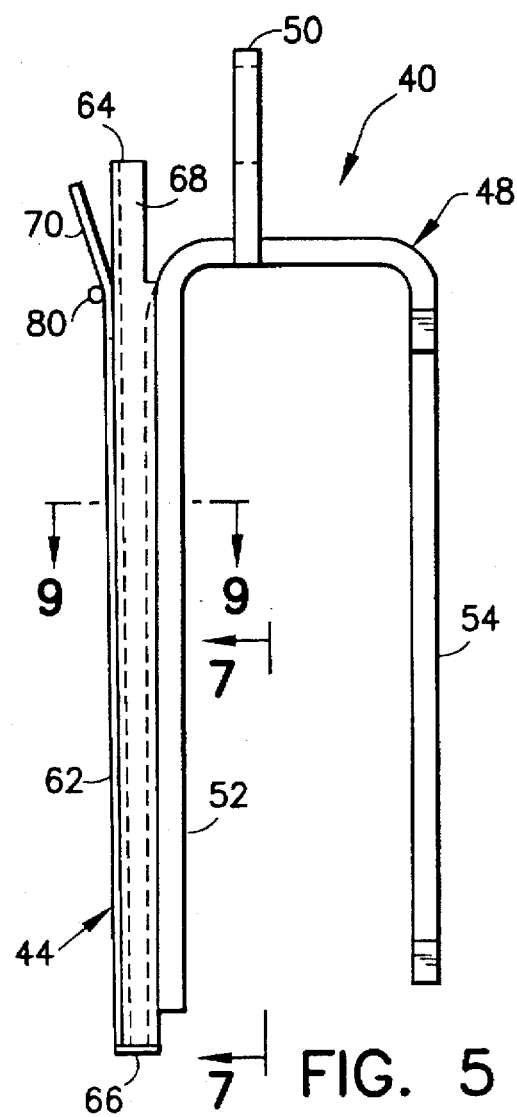

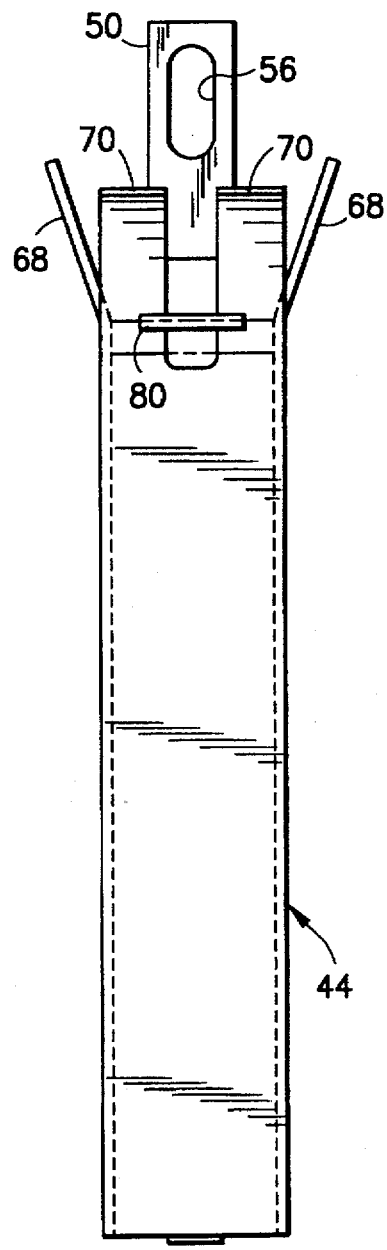
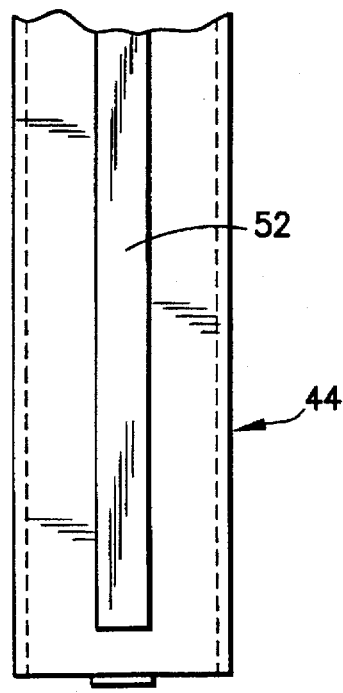
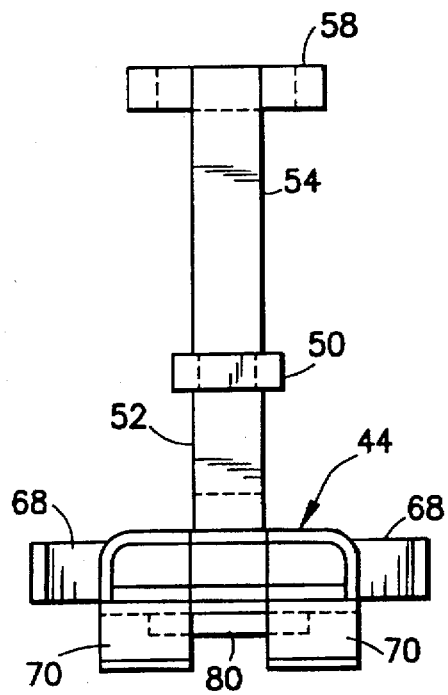
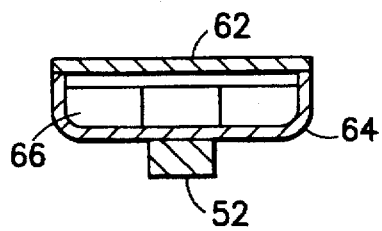
FIG. 6
FIG. 7
FIG. 8
FIG. 9

NEUTRON FLUENCE SURVEILLANCE CAPSULE HOLDER MODIFICATION FOR BOILING WATER REACTOR

FIELD OF THE INVENTION

This invention is directed to devices that measure and monitor the neutron fluence inside a light-water nuclear reactor. In particular, the invention relates to devices which measure the neutron fluence and its effect on vessel materials at various positions in the annular space between the pressure vessel and core shroud of a boiling water reactor for the purpose of monitoring vessel embrittlement.

BACKGROUND OF THE INVENTION

One type of conventional boiling water reactor, the BWR/6, is shown in FIG. 1. During operation of the reactor, coolant water circulating inside a reactor pressure vessel 10 is heated by nuclear fission produced in the nuclear fuel core 20. Feedwater is admitted into the reactor pressure vessel 10 via a feedwater inlet 12 and a feedwater sparger 14. The feedwater flows downwardly through the downcomer annulus 16, which is an annular region between reactor pressure vessel 10 and a core shroud 18. The core shroud 18 is a stainless steel cylinder which surrounds the nuclear fuel core 20. The fuel core is made up of a multiplicity of fuel bundle assemblies 22 (only two 2×2 arrays of which are shown in FIG. 1). Each array of fuel bundle assemblies is supported at the top by a top guide 24 and at the bottom by a core plate 26. The coolant water flows downward through the downcomer annulus 16 and into the core lower plenum 25. The water in the lower plenum in turn flows upward through the fuel core 20. In particular, water enters the fuel assemblies 22, wherein a boiling boundary layer is established. A mixture of water and steam exits the fuel core and enters the core upper plenum under the shroud head 28. The steam-water mixture then flows through standpipes 30 on top of the shroud head 28 and enters the steam separators 32, which separate water from steam. The water is recirculated back to the downcomer annulus and the steam flows out of the RPV and to the gas turbines (not shown).

The BWR/6 also includes a coolant recirculation system which provides the forced convection flow through the core necessary to attain the required power density. A portion of the water is sucked from the lower end of the downcomer annulus 16 via recirculation water outlet 34 and forced by a centrifugal recirculation pump (not shown) into a plurality of jet pump assemblies 36 (only one of which is shown) via recirculation water inlets 38. The jet pump assemblies are circumferentially distributed around the core shroud 18 and provide the required reactor core flow. A typical BWR/6 has 16 to 24 inlet mixers.

During operation of reactors of the foregoing type, various reactor parameters are measured and monitored to ensure safe operation. In particular, Federal regulations require the institution of a material surveillance program for the purpose of monitoring changes in the fracture toughness properties of ferritic materials in the reactor vessel beltline region of light-water nuclear power reactors resulting from exposure of these materials to neutron irradiation and the thermal environment. Under the material surveillance program, fracture toughness test data are obtained from material specimens exposed in surveillance capsules. In accordance with the requirements of Appendix H of 10 CFR, Part 50, the surveillance specimen capsules must be located near the inside vessel wall in the beltline region so that the specimen irradiation history duplicates, to the extent practicable within the physical constraints of the system, the neutron spectrum, temperature history and maximum neutron fluence experienced by the reactor vessel inner surface. The capsule holders can be attached to the vessel wall or to the vessel cladding. The design and location of the capsule holders must permit periodic removal of the capsules.

The BWR/6 and Nine Mile Point 2 (NMP-2) plants have a surveillance capsule design different from other boiling water reactors. A major difference is the compactness of the BWR/6 and NMP-2 capsules. This compactness, in turn, created the requirement to reach further down into the vessel to remove the capsules. As a result, the designed locations of the surveillance capsules were intended to facilitate removal during an outage and do not provide the optimum level of irradiation of the specimens.

At different azimuthal locations in the vessel, there are peaks and valleys in the neutron fluence. Ideally, the surveillance capsules should be located at a peak, leading the accumulation of fluence on the vessel (thus the term "lead factor"). In the subject group of plants, the capsules are located in or near fluence valleys, so that the capsules lag the vessel in fluence accumulation.

Currently, NRC regulation 10 CFR, Part 50, Appendix H, references ASTM Standard E185, which specifies that the lead factor should be between 1 and 3. This was not specified at the time of BWR/6 design, and in the cases of BWR/6 and NMP-2 reactors, the lead factor relative to the vessel inside surface is about 0.3–0.7.

Thus, there is a need to design a modification to the surveillance capsules for the BWR/6 and NMP-2 nuclear power plants to increase the lead factor to a value to be determined on a plant-by-plant basis. The modification should achieve the desired lead factor (1–3) at minimal cost with minimal outage time.

SUMMARY OF THE INVENTION

The present invention is a device for carrying out a surveillance program to monitor radiation embrittlement in the reactor pressure vessel. The proposed idea is to develop a design modification for the BWR/6 and NMP-2 surveillance programs to accelerate the accumulation of future fluence (i.e., increase the lead factor). The similarity of the surveillance capsules, and their brackets on the vessel wall, will allow one modification concept to be applicable to NMP-2 and all BWR/6's, with possible minor subtleties addressed in plant-specific variations.

The current capsule holder configuration for the NMP-2 and BWR/6 nuclear power plants is against the inside surface of the reactor vessel, near the midcore height. The capsule holder is configured to receive and hold a remotely insertable surveillance capsule in a generally upright position. The capsule is installed on the vessel wall and left in place for a predetermined period of reactor operation time for the purpose of monitoring the neutron fluence. After the surveillance period has terminated, the capsule can be removed from the reactor. Then the specimens are removed from the capsule and examined in a laboratory to determine the neutron fluence and its effect on vessel materials.

The surveillance capsule lead factor could be increased by changing the azimuthal location, but this would be costly and technically difficult. The same goal of increasing fluence, and thus, increasing the lead factor, can be accomplished in accordance with the preferred embodiment of the invention by moving the surveillance capsule radially closer to the core. With the water moderator in the downcomer annulus, the fluence rate increases significantly when moving radially inward from the pressure vessel inside surface toward the core. This increase in fluence rate is shown schematically in FIG. 2.

The preferred embodiment of the present invention is an offset capsule holder assembly which fits in an existing capsule holder attached to the inner surface of the pressure vessel wall. The offset capsule holder assembly positions a new capsule holder radially closer to the core, by an amount determined by neutron transport calculations. The new capsule holder is geometrically identical to the original, or a "replacement in kind", allowing the original surveillance capsules to be immediately reinstalled.

The surveillance capsule holder modification of the present invention applies to the BWR/6, NMP-2 type of capsule holder design. It requires no special tools to install or remove either the capsule holder or the capsule itself. The invention provides a quick and relatively low cost way to proactively improve the surveillance capsule program at the BWR/6 and NMP-2 nuclear power plants. Plant operators will be able to customize the capsule position to meet their plant specific needs, which may include license renewal. The "replacement in kind" approach allows the plant operators to use existing surveillance capsules, thus simplifying the option of future capsule reinstallations.

BRIEF DESCRIPTION OF THE DRAWINGS

FIG. 4 is a schematic showing a sectional view, taken along section line 4—4 in FIG. 3, of the capsule holder modification in accordance with the preferred embodiment of the invention.

FIG. 5 is a schematic showing a side view of the offset capsule holder assembly in accordance with the preferred embodiment of the invention.

FIG. 6 is a schematic showing a front view of the offset capsule holder assembly shown in FIG. 5.

FIG. 7 is a schematic showing a view, taken along line 7—7 in FIG. 5, of a portion of the offset capsule holder assembly in accordance with the preferred embodiment of the invention.

FIG. 8 is a schematic showing a top view of the offset capsule holder assembly shown in FIG. 5.

FIG. 9 is a schematic showing a sectional view, taken along line 9—9 in FIG. 5, of a portion of the offset capsule holder assembly in accordance with the preferred embodiment of the invention.

DETAILED DESCRIPTION OF THE PREFERRED EMBODIMENT

Figure 1:
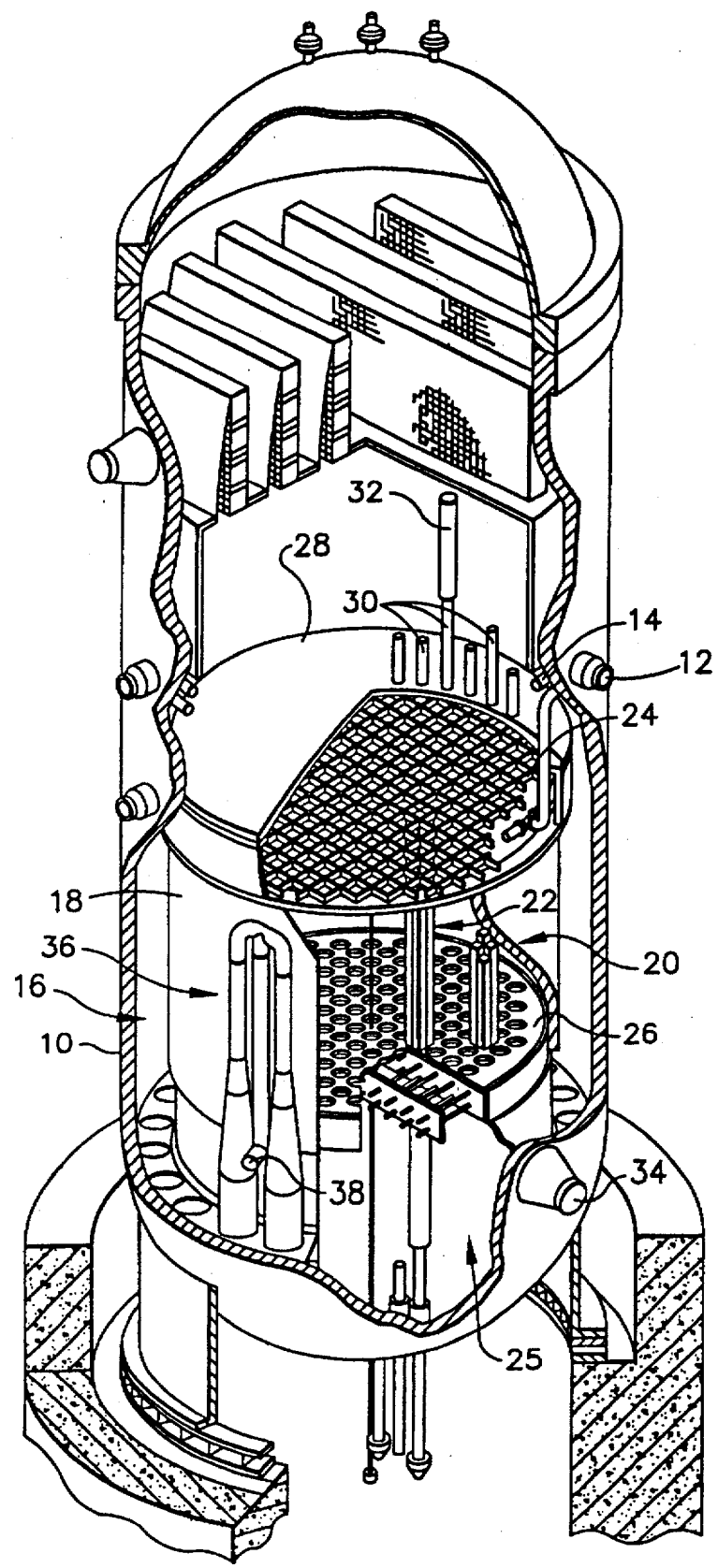
FIG. 1 is a schematic showing a partially cutaway perspective view of a conventional BWR.
Figure 2:
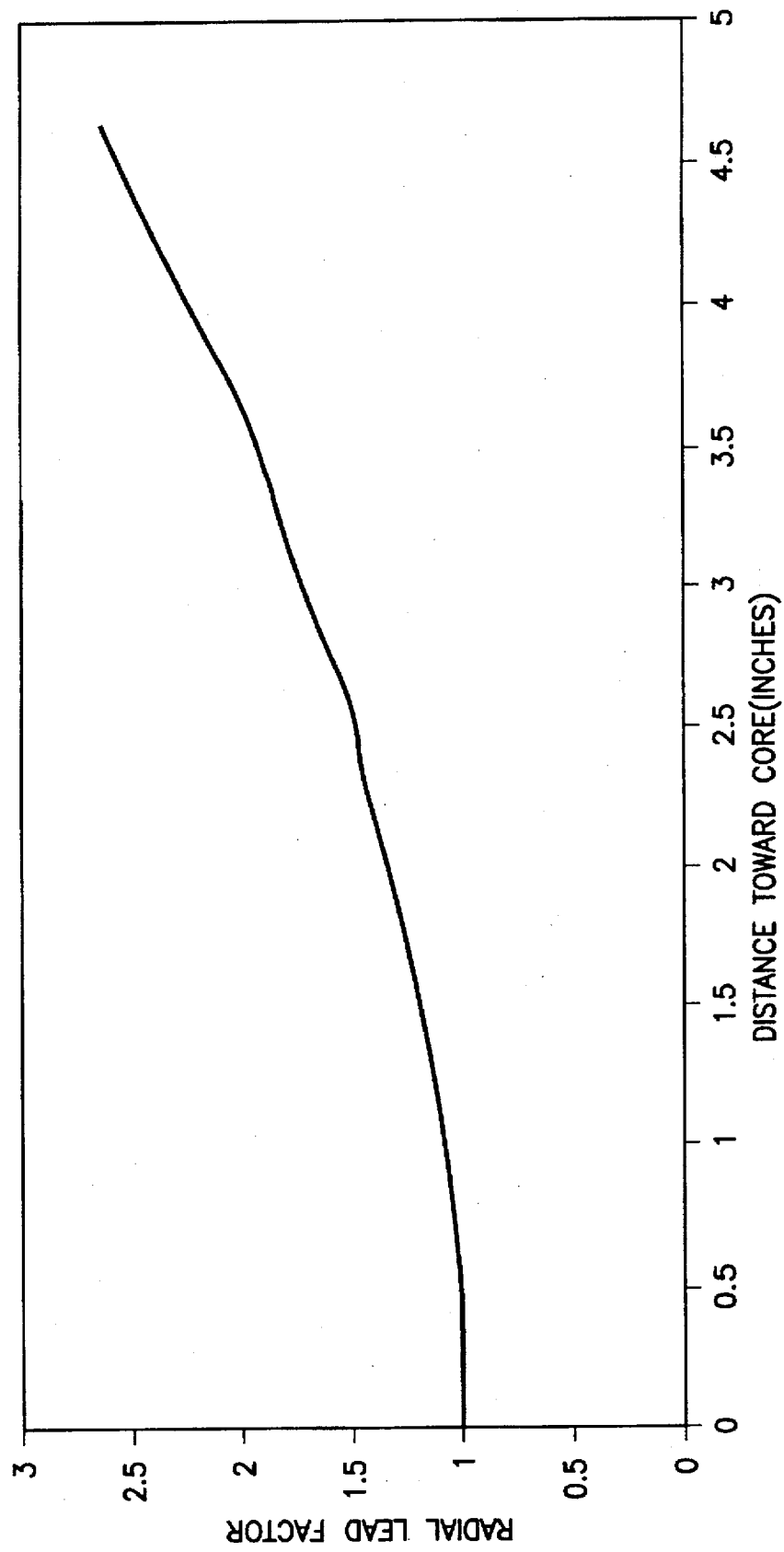
FIG. 2 is a graph showing the radial lead factor as a function of the distance separating the capsule from the inner surface of the pressure vessel.
Figure 3:
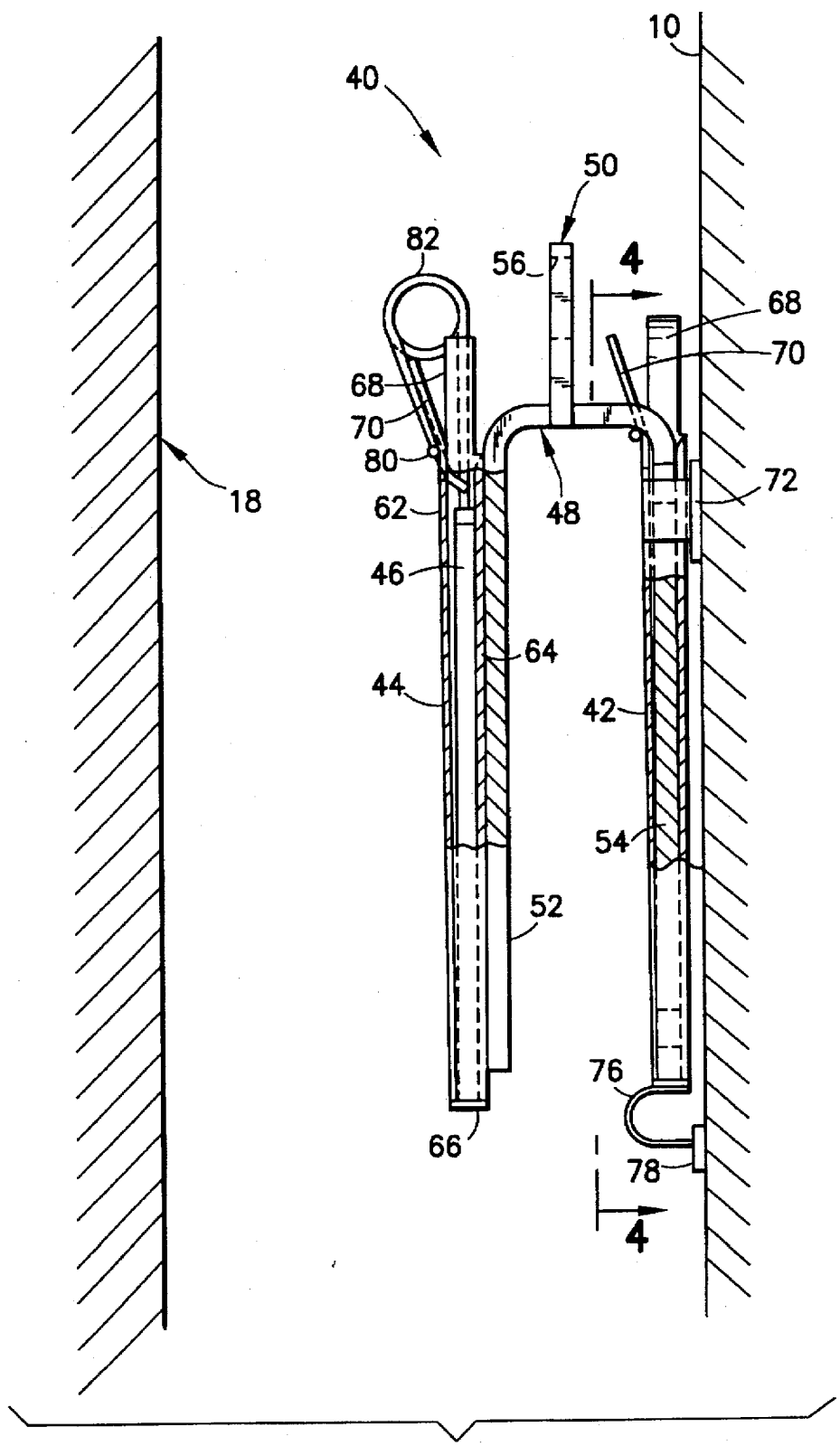
FIG. 3 is a schematic showing a partially sectioned side view of the capsule holder modification in accordance with the preferred embodiment of the invention.

Referring to FIG. 3, the preferred embodiment of the capsule holder modification in accordance with the invention comprises an offset capsule holder assembly 40 which is inserted in and supported by a capsule holder 42 affixed to the inner surface of the pressure vessel 10. The offset capsule holder assembly 40 comprises an offset capsule holder 44 preferably having the same configuration as that of the capsule holder 42. However, it will be apparent that the offset capsule holder 44 may differ somewhat from the capsule holder 42 as long as the offset capsule holder 44 is capable of performing its function of holding the same type of surveillance capsule 46 which the capsule holder 42 was designed to hold.

The offset capsule holder assembly 40 further comprises a positioning arm assembly 48 having a generally U-shaped profile. As best seen in FIG. 5, the positioning arm assembly 48 comprises a holding lug 50 welded on one side to an end of a left arm 52 and welded on the other side to an end of a right arm 54. Preferably, the left and right arms are mutually parallel, so that the offset capsule holder assembly will hold the offset capsule holder in a position which is displaced relative to, but not rotated relative to, the position of the capsule holder 42.

The offset capsule holder 44 is mounted to the left arm 52 of the positioning arm assembly 48. As seen in FIGS. 5 and 7, the left arm 52 takes the form of a bar. The left arm 52 has a generally straight portion, to which the offset capsule holder 44 is attached, and a curved portion, the distal end of which is welded to the holding lug 50. Similarly, the right arm 54 has a generally straight portion and a curved portion, the distal end of which is welded to the holding lug 50. The generally straight portion of right arm 54 has a width which varies along the arm axis, i.e., an upper increased-width portion 58 and a lower increased-width portion 60. The width of portions 58 and 60 is slightly less than the width of the interior space of the capsule holder 42, so that portions 58 and 60 act as bearing surfaces which bear against the opposing surfaces inside the capsule holder 42 and hold the offset capsule holder assembly 40 upright.

The capsule holder 42 comprises a front plate 62, a channel 64 and a bottom plate 66 welded together to form a holder in the shape of a parallelepiped which is open at the top. The channel 62 has a pair of opposing sides connected by a base, the space between the opposing sides being closed by the front plate, as shown in FIG. 9. The top of each side of the channel has a respective extension 68 which is inclined at an acute angle relative to the plane of the channel side. As seen in FIGS. 6 and 8, the extensions 68 extend away from each other. Similarly, the front plate 62 has a pair of extensions 70, a distal portion of each extension being inclined at an acute angle relative to the plane of the front plate. A rod 80 is attached to the extensions 70 at the bend line and bridging the gap therebetween. The circular handle 81 on the capsule (see FIG. 3) is a spring. The spring arm has a bend which engages rod 80, providing a locking device (or active retention) of the capsule in the holder. As seen in FIG. 3, the extensions 70 extend away from the reactor pressure vessel wall 10.

In the conventional application of the capsule holder 42, during the remotely controlled lowering of a surveillance capsule into the capsule holder 42, the inclined extensions 68 and 70 act as slide surfaces which guide the surveillance capsule into the interior volume of the capsule holder 42. In the application of the present invention, the capsule holder 42 serves to hold the offset capsule holder assembly 40 instead of a surveillance capsule.

As best seen in FIG. 6, the holding lug 50 of the offset capsule holder assembly 40 comprises an eyelet 56. The eyelet 56 is adapted to receive the coupling element of a grapple or other lifting tool (not shown), which can be used to install the offset capsule holder assembly 40 by lowering it into position or to remove the offset capsule holder assembly 40 by raising it up. As the offset capsule holder assembly 40 is lowered with the right arm 54 of the positioning arm assembly 48 overlying the capsule holder 42, the right arm 54 will be guided into the capsule holder 42 by the inclined extensions 68 and 70.

As seen in FIG. 4, the capsule holder 42 is attached to a pair of pressure vessel bracket pads 72 via a corresponding pair of brackets 74 which extend generally transverse to the longitudinal axis of the capsule holder 42. A U-shaped spring 76 has one leg attached to the bottom plate 66 of capsule holder 42. The distal end of the other leg of spring 76 bears against a pressure vessel spring pad 78. The pads 72 and 78 are preferably welded to the interior surface of the vessel wall. Likewise, brackets 74 are welded to pads 72 and spring 76 is welded to spring pad 78.

As seen in FIGS. 3 and 5, the offset capsule holder 44 is attached to the left arm 52 of the positioning arm assembly 48. The offset capsule holder 44 preferably has a structure identical to that of the capsule holder 42, except that the brackets 74 and the spring 76 are not needed. The offset capsule holder receives a capsule 46, and then the capsule holder is lowered into position using a remotely operated positioning tool. As seen in FIG. 3, the offset capsule holder assembly allows the surveillance capsule 46 to be held at a radial position which is closer to shroud 18 by a distance D, which will be specific to a given plant and to a particular azimuthal position and removal period. For example, in one plant the value D varied from 5.2 to 7.4 inches for different azimuthal positions and removal periods. This displacement of the surveillance capsule closer to the nuclear fuel core increased the lead factor to a value in the desired range of 1–3.

The preferred embodiment of the offset capsule holder assembly has been disclosed for the purpose of illustration. Variations and modifications of the disclosed structure which do not depart from the concept of this invention will be readily apparent to engineers skilled in the design of tooling. All such variations and modifications are intended to be encompassed by the claims set forth hereinafter.

I claim:

1. An apparatus for mounting a surveillance capsule on an internal surface of a reactor pressure vessel wall, comprising:

a first capsule holder having an interior space configured for receiving a surveillance capsule, said first capsule holder being attached to said reactor pressure vessel wall;

a second capsule holder having an interior space configured for receiving said surveillance capsule; and a positioning arm assembly comprising first and second arms, said second capsule holder being attached to said first arm and said second arm being slidably inserted in said first capsule holder, said positioning arm assembly being configured so that said second capsule holder is further away from said reactor pressure vessel wall than is said first capsule holder.

2. The apparatus as defined in claim 1, wherein said first arm comprises a straight portion, said second arm comprises a straight portion, and said straight portions of said first and second arms are mutually parallel.

3. The apparatus as defined in claim 1, wherein said positioning arm assembly further comprises a handling lug having an eyelet.

4. The apparatus as defined in claim 1, wherein said second arm has a width at first and second elevations only slightly less than a width of said interior space of said first capsule holder.

5. The apparatus as defined in claim 1, wherein said second capsule holder further comprises a plurality of guide surfaces extending outward at an acute angle of inclination relative to a longitudinal axis of said second capsule holder.

6. An apparatus for holding a surveillance capsule, comprising:

a capsule holder having an interior space configured for receiving a surveillance capsule, said capsule holder having a closed bottom and an open top; and a generally U-shaped positioning arm assembly comprising first and second generally straight members connected by a base, said generally straight members being mutually parallel, wherein said capsule holder is attached to and parallel with said first arm, said closed bottom of said capsule holder being located near a distal end of said first arm and said open top being located near said base.

7. The apparatus as defined in claim 6, wherein said positioning arm assembly further comprises a handling lug having an eyelet.

8. The apparatus as defined in claim 6, wherein said second arm has a width at first and second elevations only slightly less than a width of said interior space of said capsule holder.

9. The apparatus as defined in claim 6, wherein said capsule holder further comprises a plurality of guide surfaces extending outward at an acute angle of inclination relative to a longitudinal axis of said capsule holder.

10. A method for increasing the lead factor at a predetermined azimuthal position whereat a first capsule holder is affixed to an internal surface of a pressure vessel wall of a light water nuclear reactor, comprising the steps of:

constructing a second capsule holder having a configuration substantially similar to the configuration of said first capsule holder, said second capsule holder having a closed bottom and an open top at different positions along a longitudinal axis;

attaching said second capsule holder to a first portion of a support structure having a predetermined dimension in a direction generally perpendicular to said longitudinal axis;

coupling a second portion of said support structure to said first capsule holder so that said second capsule holder and said support structure are supported by said first capsule holder with said longitudinal axis of said second capsule holder being generally vertical, wherein said support structure is disposed so that said second capsule holder is closer than said first capsule holder to a fuel core inside a core shroud; and inserting a surveillance capsule inside said second capsule holder.

* * * * *